United States Patent
Tabet et al.

(10) Patent No.: US 10,660,110 B2
(45) Date of Patent: May 19, 2020

(54) ADAPTIVE THROUGHPUT AND BANDWIDTH FOR ENHANCED CATEGORY OF MOBILE DEVICES

(71) Applicant: Apple Inc., Cupertino, CA (US)

(72) Inventors: Tarik Tabet, Los Gatos, CA (US); Samy Khay-Ibbat, San Francisco, CA (US); Krisztian Kiss, Hayward, CA (US); Rafael L. Rivera-Barreto, Santa Clara, CA (US); Cesar Perez, Sunnyvale, CA (US); Moustafa M. Elsayed, Los Gatos, CA (US); Prashant H. Vashi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 15/496,388

(22) Filed: Apr. 25, 2017

(65) Prior Publication Data

US 2017/0359829 A1 Dec. 14, 2017

Related U.S. Application Data

(60) Provisional application No. 62/348,875, filed on Jun. 11, 2016.

(51) Int. Cl.
*H04W 72/08* (2009.01)
*H04W 72/04* (2009.01)

(52) U.S. Cl.
CPC ....... *H04W 72/087* (2013.01); *H04W 72/042* (2013.01); *H04W 72/048* (2013.01); *H04W 72/0453* (2013.01)

(58) Field of Classification Search
CPC ............. H04W 72/087; H04W 72/042; H04W 72/048
See application file for complete search history.

(56) References Cited

U.S. PATENT DOCUMENTS 5,608,727 A * 3/1997 Perreault .................. H04J 1/12
370/462
6,826,160 B1 * 11/2004 Wang ................... H04W 28/20
370/329

(Continued)

FOREIGN PATENT DOCUMENTS

GB 2 530 502 A 3/2016

OTHER PUBLICATIONS

International Search Report and Written Opinion, Application No. PCT/US2017/033565, dated Sep. 1, 2017, 15 pages.

*Primary Examiner* — Rasheed Gidado
(74) *Attorney, Agent, or Firm* — Kowert Hood Munyon Rankin and Goetzel PC; Jeffrey C. Hood; Matthew C. Washburn

(57) ABSTRACT

A user equipment (UE) device may communicate according to a new device category satisfying specified QoS (quality of service) requirements while also satisfying specified link budget requirements, and additional optimization requirements. The new device category may identify the UE device as a wearable device. According to some embodiments, LTE category M may be extended to support non-MTC operations performed by wearable devices. For example, the new device category may support UE mobility and may disallow access barring. Additional extensions may be implemented in response to an indication by the UE that the UE is implementing a specific application, such as VoLTE or a near real-time application, such as audio streaming. In some scenarios, the indication may include the UE indicating a specific QCI value. In some scenarios, the indication may include the UE attaching to a specific APN.

20 Claims, 6 Drawing Sheets

(56) References Cited

U.S. PATENT DOCUMENTS

| | | | |
|---|---|---|---|
| 7,116,682 B1* | 10/2006 | Waclawsky | H04J 3/1682 370/468 |
| 9,344,933 B1 | 5/2016 | Velusamy et al. | |
| 2010/0057485 A1* | 3/2010 | Luft | H04W 4/70 455/411 |
| 2012/0213072 A1* | 8/2012 | Kotecha | H04W 28/0268 370/235 |
| 2014/0335877 A1 | 11/2014 | Roberts et al. | |
| 2015/0016377 A1* | 1/2015 | Kim | H04B 7/2615 370/329 |
| 2015/0305056 A1 | 10/2015 | Vangala et al. | |
| 2016/0135177 A1 | 5/2016 | Ahn et al. | |
| 2016/0173805 A1* | 6/2016 | Claus | H04N 17/004 348/148 |
| 2016/0191267 A1* | 6/2016 | Zhang | H04W 4/50 709/219 |
| 2016/0191604 A1* | 6/2016 | AbiEzzi | H04L 67/025 715/740 |
| 2016/0338088 A1* | 11/2016 | Fakoorian | H04W 72/1263 |
| 2016/0352405 A1 | 12/2016 | Challa et al. | |
| 2017/0171088 A1* | 6/2017 | Shor | H04L 47/30 |
| 2017/0223725 A1* | 8/2017 | Xiong | H04L 5/0053 |

* cited by examiner

ADAPTIVE THROUGHPUT AND BANDWIDTH FOR ENHANCED CATEGORY OF MOBILE DEVICES

PRIORITY INFORMATION

This application claims priority to U.S. provisional patent application Ser. No. 62/348,875, titled "Adaptive Throughput and Bandwidth for Enhanced Category of Mobile Devices," by Tarik Tabet, et al., filed Jun. 11, 2016, which is hereby incorporated by reference in its entirety as though fully and completely set forth herein.

FIELD OF THE INVENTION

The present application relates to wireless communications, and more particularly to a new and/or enhanced category of devices in 3GPP wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH, etc.

Various ones of the wireless communications standards, such as LTE, utilize packet switched networks. The LTE specification defines a number of User Equipment (UE) categories, where each LTE category defines the overall performance and the capabilities of a UE. These LIE categories define the standards to which a particular handset, dongle or other equipment will operate in the communication system. The LTE categories or UE classes are used to ensure that the base station (e.g., enhanced NodeB, or eNodeB or eNB) can communicate correctly with the user equipment. The UE relays the LTE UE category information to the base station, and thus the base station is able to determine the performance characteristics of the UE and communicate with the UE accordingly. This enables the base station to communicate using capabilities that it knows the UE possesses. While users may not be particularly aware of the category of their UE, the performance of the UE matches the UE's category and allows the base station to communicate effectively with all the UEs that are connected to it. The LTE UE category information therefore may be important to the performance of the UE.

The base station may be less likely to communicate beyond the performance indicated by the category of the UE. Thus, it may be desirable to introduce one or more new UE categories to provide for flexibility in operation. Accordingly, improvements in the field are desirable.

SUMMARY OF THE INVENTION

Embodiments are presented herein of, inter alia, methods for wireless communication devices communicating, e.g., with cellular base stations, according to a new device category, and of devices that implement the methods. Embodiments are further presented herein for wireless communication systems containing user equipment (UE) devices and base stations communicating with each other within the wireless communication systems.

In various embodiments, a user equipment (UE) device may communicate according to the new device category satisfying specified QoS (quality of service) requirements while also satisfying specified link budget requirements, and additional optimization requirements. The new device category may identify the UE device as a wearable device. According to some embodiments, LTE category M may be extended to support non-MTC operations performed by wearable devices. For example, the new device category may support UE mobility and may disallow access barring. Additional extensions may be implemented in response to an indication by the UE that the UE is implementing a specific application, such as VoLTE or a near real-time application, such as audio streaming. In some scenarios, the indication may include the UE indicating a specific QCI value. In some scenarios, the indication may include the UE attaching to a specific APN.

A method is disclosed for conducting wireless communications between a user equipment device (UE) and a wireless communication network. The method may include the UE communicating to the wireless communication network a device category of the UE, wherein the device category identifies the UE as a wearable device. The UE may establish a communication channel with the wireless communication network, the communication channel having parameters determined at least in part based on the device category of the UE. The parameters may include a fixed bandwidth. The UE may indicate to the wireless communication network, after establishing the communication channel, that the UE is implementing a specific application. For example, indicating that the UE is implementing the specific application may include specifying a QCI value and/or requesting attachment to a specific APN. In response to the UE indicating that it is implementing a specific application, the UE may receive an indication from the wireless communication network that the communication channel parameters have changed. For example, receiving the indication that the communication channel parameters have changed may include establishing a dedicated bearer for the specific application. The changed parameters may include an increased bandwidth, and may include a dynamic bandwidth determined by the wireless communication network. In some embodiments, the changed parameters may further include changed quality of service (QoS) parameters.

In some embodiments, the specific application may include a voice over Internet protocol (VoIP) application. The UE may utilize a machine type communications (MTC) physical downlink control channel (M-PDCCH) for scheduling bundled VoIP audio packets.

A user equipment device (UE) is disclosed, which may include at least one memory and at least one processor coupled to the at least one memory. The at least one processor may be configured to cause the UE to establish a communication channel with a wireless communication network, the communication channel having initial parameters consistent with a device category of the UE, such as a wearable device category. For example, the initial parameters may include a fixed bandwidth. The at least one processor may be further configured to cause the UE to transmit to the wireless communication network, after establishing the communication channel, a first indication that the UE is implementing a specific application. For example, indicating that the UE is implementing the specific application may include specifying a QCI value. The at least one processor may be further configured to cause the UE to receive a second indication from the wireless communication network, responsive to the first indication, that the communication channel parameters have changed. For example, the changed parameters may comprise an increased bandwidth, and may include a dynamic bandwidth determined by the wireless communication network.

In some embodiments, the initial parameters may be further consistent with a device of the device category of the UE implementing delay-tolerant applications, and the changed parameters are consistent with a device of the device category of the UE implementing a voice over Internet protocol (VoIP) application.

In some embodiments, the specific application may include a VoIP application, and the at least one processor may be further configured to cause the UE to utilize an M-PDCCH for scheduling bundled VoIP audio packets.

A non-transitory computer-readable medium is disclosed, storing program instructions executable by at least one processor of a user equipment device (UE). The program instructions may cause the UE to communicate with a wireless communication network via a communication channel having first parameters specified by a wearable device category for a wearable device implementing a delay-tolerant application. For example, the first parameters may include a fixed bandwidth. The program instructions may further cause the UE to initiate implementation of a voice over Internet protocol (VoIP) application, and to transmit to the wireless communication network, over the communication channel having the first parameters, a first indication that the UE is implementing the VoIP application. The program instructions may further cause the UE to receive a second indication from the wireless communication network, responsive to the first indication, that the communication channel has changed to have second parameters. For example, the second parameters may include an increased bandwidth, and may include a dynamic bandwidth determined by the wireless communication network. The program instructions may be further executable to cause the UE to reconfigure operational settings of the UE to communicate with the wireless communication network according to the second parameters, in response to receiving the second indication.

In some embodiments, the second parameters may include use of a machine type communications (MTC) physical downlink control channel (M-PDCCH) for scheduling bundled VoIP audio packets.

In some embodiments, the program instructions may further cause the UE to initiate implementation of a time-sensitive periodic application after receiving the second indication, and transmit to the wireless communication network, over the communication channel having the second parameters, a third indication that the UE is implementing the time-sensitive periodic application. The program instructions may further cause the UE to transmit to the wireless communication network, over the communication channel having the second parameters, a fourth indication that the UE has stopped implementing the VoIP application, and to receive a fifth indication from the wireless communication network, responsive to the fourth indication, that the communication channel has changed to have third parameters, different than the first parameters and the second parameters.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
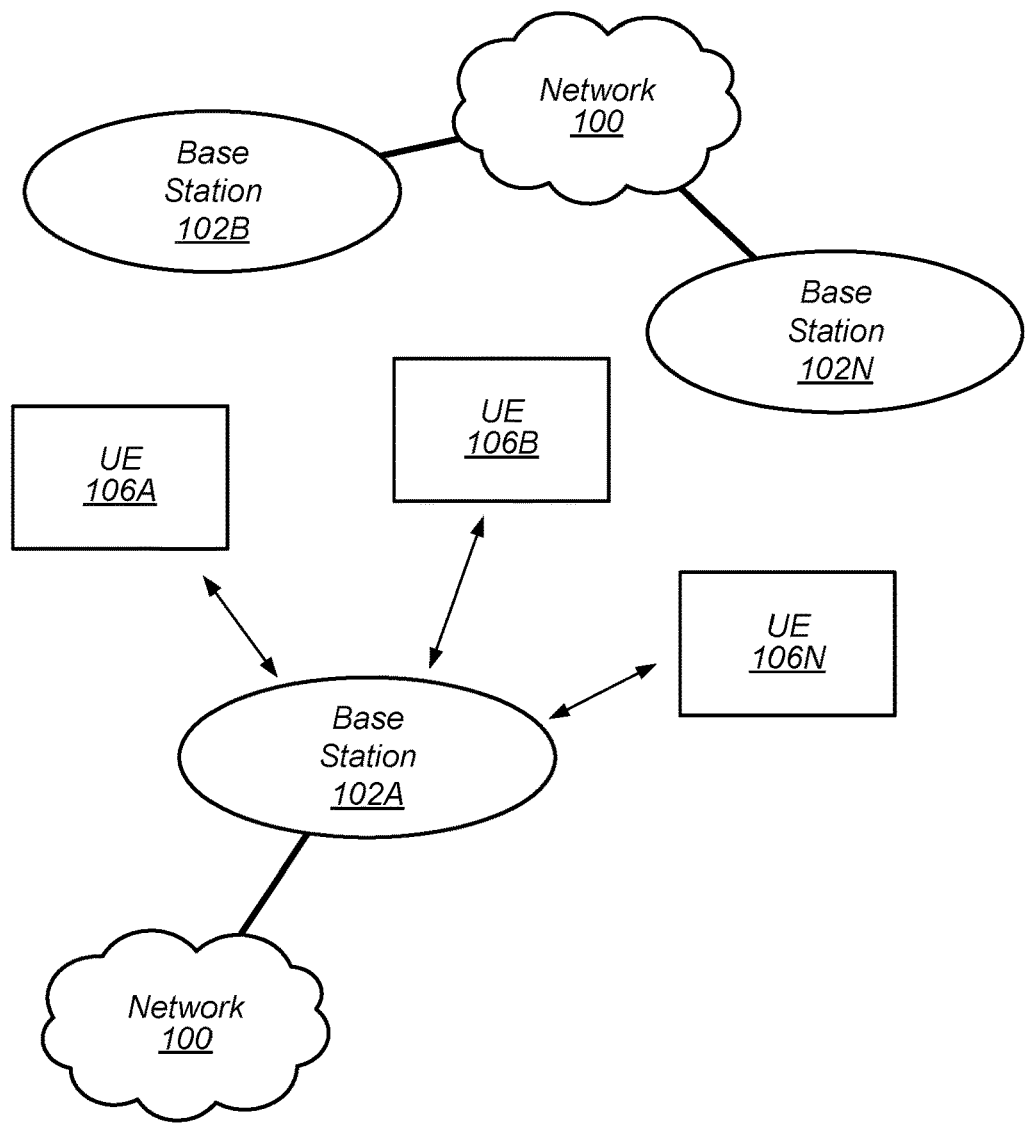
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AP: Access Point
APN: Access Point Name
BS: Base Station
DL: Downlink (from BS to UE)
DRB: Data Radio Bearer
EPS: Evolved Packet System
GBR: Guaranteed Bit Rate
GSM: Global System for Mobile Communication
IP: Internet Protocol
LAN: Local Area Network
LTE: Long Term Evolution
MME: Mobility Management Entity
M-PDCCH: MTC Physical Downlink Control Channel MTC: Machine Type Communications
PDCCH: Physical Downlink Control Channel
PDN: Packet Data Network
PGW: PDN Gateway
QCI: QoS Class Identifier
QoS: Quality of Service
RAT: Radio Access Technology
RB: Resource Block
SGW: Serving Gateway
SPS: Semi-Persistent Scheduling
UE: User Equipment
UL: Uplink (from UE to BS)
UMTS: Universal Mobile Telecommunication System
VoIP: Voice over IP
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. UEs may also be referred to herein as wireless communication devices. Examples of UE devices include mobile telephones or smart phones (e.g., iPhone™, Android™-based phones) and tablet computers such as iPad™, Samsung Galaxy™, etc., portable gaming devices (e.g., Nintendo DS™ PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include cellular and/or Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Wearable Device—refers to a computer system or component thereof designed or intended to be worn by a user, e.g., as clothing or an accessory, and which performs wireless communications. Examples of wearable devices include smart watches (e.g., Apple Watch™), smart glasses (e.g., Google Glass™), fitness trackers with wireless communication capabilities, etc. Wearable devices may sometimes include functionality dependent upon physical contact with the user, such as monitoring of pulse rate or other health metrics. Wearable devices may sometimes include functionality dependent upon being worn in a particular location on the body of the user, such as on the user's wrist or in a fixed location relative to the user's eyes. Mobile telephones, smart phones, and tablet computers having traditional form factors are not considered wearable devices, even if carried within the clothing (e.g., in a pocket) of the user.

Link Budget Limited—includes the full breadth of its ordinary meaning, and at least includes a characteristic of a wireless device (e.g., a UE) that exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Current transmission medium conditions may also be a contributing factor. It is noted that the term "link budget limited" includes or encompasses power limitations, and thus a power limited device may be considered a link budget limited device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices that performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example, a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally, in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
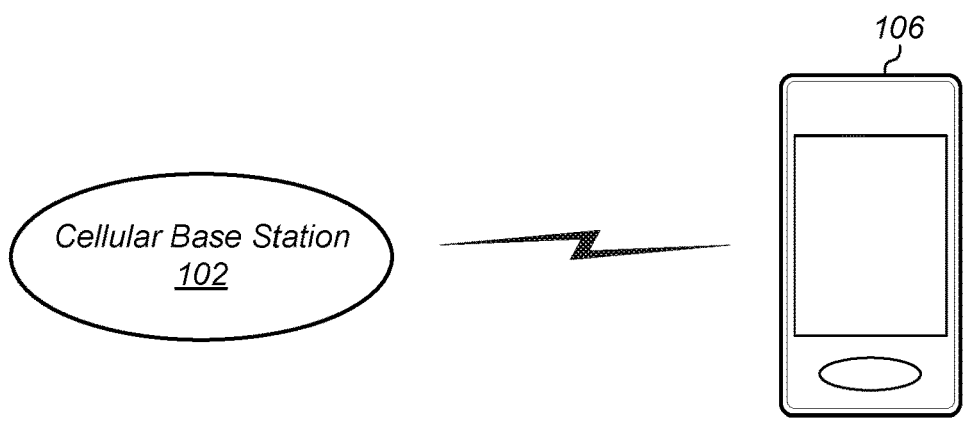
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices. Various ones of the UE devices may operate according to a new UE category as detailed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 at least according to a new and improved category designation/definition of UE 106 as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform some or all of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH'. Other configurations are also possible.

Figure 3:
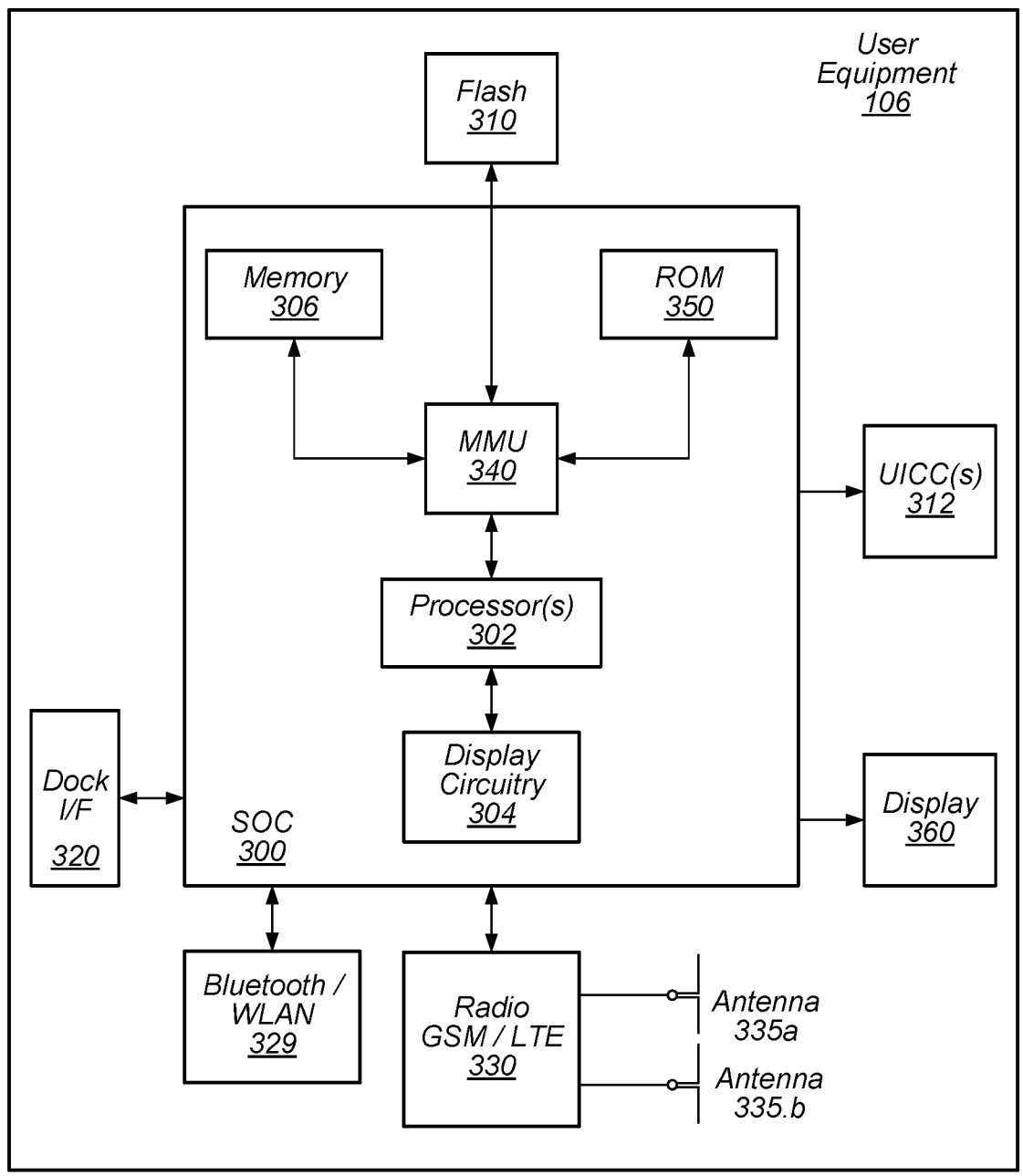
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry, such as radio circuitry 329 and 330 (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include more antennas. Overall, the one or more antennas are collectively referred to as antenna 335. For example, the UE device 106 may use antenna 335 to perform the wireless communication with the aid of radio circuitry 329 and 330. As noted above, the UE may be configured to communicate wirelessly using multiple wireless communication standards in some embodiments.

As described further subsequently herein, the UE 106 (and/or base station 102) may include hardware and software components for implementing methods for UE 106 (and/or base station 102) communication at least according to a new and improved category designation of UE 106, as will be further described herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that correspond to a new, improved category designation of UE 106, such communications including the decoding of physical control channels according to various embodiments disclosed herein. Processor(s) 302 may also implement various other applications and/or end-user applications running on UE 106.

In some embodiments, radio circuitry 329 and 330 may include separate controllers dedicated to controlling communications for various respective RAT standards. For example, as shown in FIG. 3, radio circuitry 330 may include a cellular controller (e.g. LTE controller), and radio circuitry 329 may include a Wi-Fi controller and BLUETOOTH™ controller, and in at least some embodiments, one or more or all of these controllers may be implemented as respective integrated circuits (ICs or chips, for short) in communication with each other and with SOC 300 (and more specifically with processor(s) 302) as will be further described below. For example, the Wi-Fi controller may communicate with the cellular controller over a cell-ISM link or WCI interface, and/or the BLUETOOTH™ controller may communicate with the cellular controller over a cell-ISM link, etc. While three separate controllers are illustrated within radio circuitry 329 and 330, other embodiments have fewer or more similar controllers for various different RATs that may be implemented in UE device 106.

Figure 4:
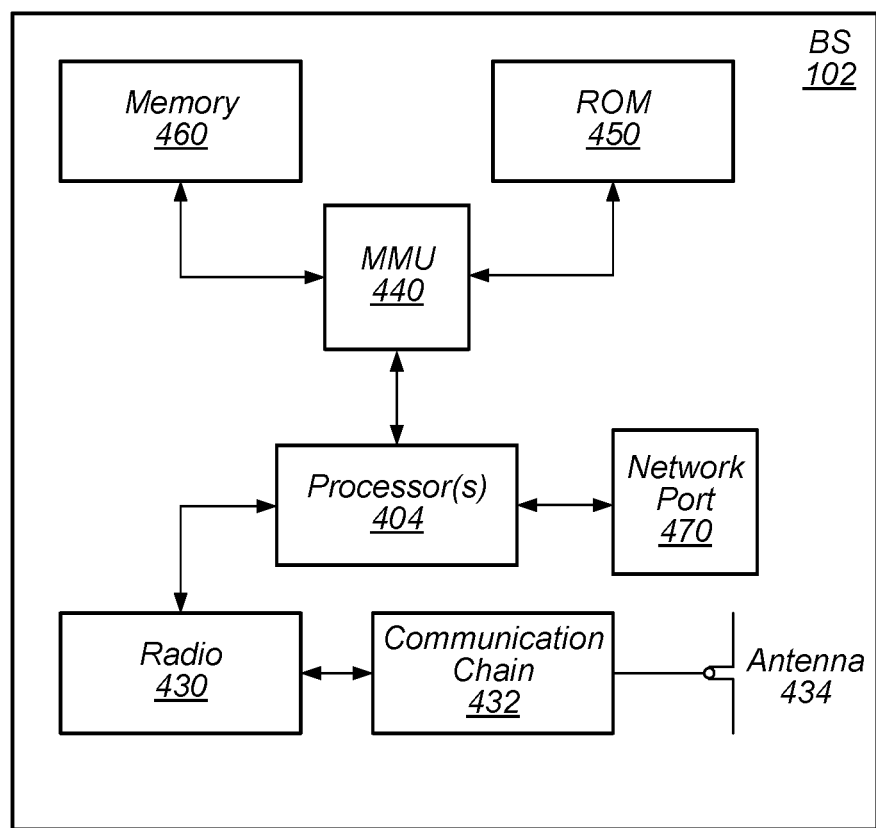
FIG. 4 illustrates an exemplary block diagram of a base station, according to some embodiments.

FIG. 4—Block Diagram of an Exemplary Base Station

FIG. 4 illustrates a block diagram of an exemplary cellular base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., for use by other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor 404 of the base station 102 may be configured to implement part or all of the methods described herein for the base station 102 to communicate with a UE device belonging to a new and/or enhanced category of devices capable of adaptively improving power consumption, link budget management, and performance during wireless communications, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices of a wider range of device categories.

Device Categories

There are many different device category definitions for LTE devices. For example, at least categories 1-17 are designated for smartphones, and most smartphones operate according to one of categories 2 to 8. In other words, smartphones typically operate as a device belonging to one of categories 2-8. Category M (Cat-M1) is typically used for MTC (Machine Type Communications) devices such as soda machines, smart meters, etc., and is defined by the LTE technical specifications, including 3GPP TS 36.306 V13.1.0 and 3GPP TS 36.133 V13.3.0, both of which are hereby incorporated herein by reference as though fully included herein. According to some embodiments, a new and/or enhanced category may be devised and tailored to a specific group of devices, for example to wearable devices such as smart watches or smart glasses.

In terms of functionality, wearable devices may represent a compromise between link budget and quality of service (QoS). For example, a wearable device may have a small form factor relative to a cellular telephone. In addition, a wearable device may be link budget limited as defined above. Thus, when considering a category within which a wearable device may operate, it may be advantageous to retain the link budget improvement and low device complexity associated with Cat-M1, e.g., because the form factor of the wearable device may limit battery size, antenna size and placement, etc.

However, Cat-M1 as currently defined may be inappropriate for a wearable device, e.g., because a wearable device may be configured to perform more advanced communications than an MTC device, such as VoLTE, audio streaming, health application monitoring, SMS/MMS messaging, etc. Thus, a wearable device may benefit from utilizing the bandwidth, QoS, and other parameters of smart phone categories. Additionally, a network may bar Cat-M1 devices from accessing the network, e.g., during certain times of day. For example, a typical Cat-M1 device, such as an MTC device, may communicate only non-time-critical data, such as electricity usage. For such devices, the network may therefore limit communications to off-peak times, such as nighttime hours, when there is little other network traffic.

For these reasons, a wearable device may utilize a new and/or enhanced category based largely on the features of Cat-M1, so as to benefit from the link budget characteristics thereof, but also utilizing certain features of other categories. Specifically, a "wearable category" may be implemented, which may be configured to support (e.g., be optimized for) wearable devices. In some scenarios, the wearable category may be a new and/or enhanced category that utilizes some of the features of Cat-M1, while additionally providing support for wearable devices. In other scenarios, Cat-M1 may be updated to support wearable devices, such that the updated version of Cat-M1 may be considered to be the wearable category.

In either case, certain characteristics may be desirable for the wearable category. For example, it may be desirable for the wearable category to: support VoIP functionality, such as VoLTE, with coverage enhancements; support increased data rates relative to the 1 Mbps supported by Cat-M1; provide coverage enhancements for data rates higher than 1 Mbps; allow increased battery life relative to smart phone categories (e.g., allow a wearable device to achieve battery life similar to that achieved by a smartphone for similar usage, despite having a different form factor); support UE mobility; support QoS; and disallow access barring by the network for devices operating according to the wearable category.

Use cases of the wearable category may be grouped into three general classifications of communication applications: delay-tolerant applications; VoIP-type applications, such as VoLTE, which have strict delay constraints; and other performance-sensitive applications, including interactive, near real-time, or low-data-rate/periodic applications, such as audio streaming. These classifications may each benefit from different characteristics of the wearable category. Specifically, for a wearable device operating according to the wearable category, the network may implement certain improvements over Cat-M1 only when the wearable device is implementing certain applications, or classifications of applications. For example, in some scenarios, increased data rates may be allocated to the wearable device only if the wearable device indicates that it is implementing a VoIP-type application or an interactive, near real-time, or low-data-rate/periodic application. Additional details follow regarding improvements applicable to each classification of applications.

Delay-Tolerant Applications

Delay-tolerant applications of a wearable device, such as email communications, SMS/MMS communications, background data updating, etc. may be similar to communications performed by MTC devices. For example, they may be communicated without urgent time constraints, and may thus be sent with low bandwidths, such as the 1.4 MHz, or 6 resource blocks (RBs), fixed bandwidth of Cat-M1. Thus, when a wearable device is implementing delay-tolerant applications, the wearable category may provide for performance similar to that of Cat-M1, such as a fixed bandwidth of 1.4 MHz, use of M-PDCCH, use of a single default data radio bearer (DRB) or a limited number of DRBs, etc. This may allow the wearable device to achieve improved battery life over use of smartphone categories.

However, even when implementing delay-tolerant applications, a wearable device may benefit from certain minor improvements in network support over that provided by Cat-M1. The wearable category may therefore provide such improvements. In some scenarios, the wearable category may provide at least such minor improvements for all applications implemented by a wearable device.

For example, the wearable category may support mobility of the wearable device. For example, the wearable category may provide for reselection and handover even at very poor radio conditions requiring the maximum of coverage enhancements.

As another example, the wearable category may disallow access barring by the network for devices operating according to the wearable category. Specifically, the network may not bar a UE operating according to the wearable category from accessing the network, e.g., during certain hours of the day.

In some scenarios, these improvements may be implemented for all UEs operating according to the wearable category, e.g., without the UE further specifying an application being implemented.

Applications that are not delay-tolerant (such as VoIP applications and other performance-sensitive applications discussed below) may sometimes be referred to as delay-intolerant applications.

VoIP Applications

VoIP-type applications, such as VoLTE, may have significantly higher performance constrains than delay-tolerant applications. For example, VoIP-type applications may have strict delay constraints. Thus, the wearable category may provide additional improvements over Cat-M1 to accommodate such higher performance, e.g., in addition to the improvements noted above with regard to delay-tolerant applications, when a wearable device indicates to the network that it is implementing a VoIP-type application.

For example, the wearable category may provide support for QoS specification. Currently, Cat-M1 provides support for only limited DRBs. The wearable category may provide support for the wearable device to use one or more dedicated DRB, e.g., with QoS class identifier (QCI) 1, for conversational voice data, and QCI5, for signaling data, when implementing VoLTE. Thus, the wearable device may indicate to the network that it is implementing VoLTE by indicating QCI1 and QCI5. Based on (e.g., in response to) the wearable device indicating QCI1 and QCI5, the base station may determine that the communication is VoLTE, and may make other performance adjustments, e.g., to bandwidth, QoS, etc. Alternatively, the wearable device may indicate to the network in some other way that it is implementing VoLTE.

For UEs operating according to the wearable category, VoIP-type applications, such as VoLTE, may be scheduled based on M-PDCCH, rather than PDCCH. This may allow a wearable device to benefit from coverage enhancement of M-PDCCH (e.g., time repetition) in order to schedule a resource assignment to a grant for VoLTE.

One concern with using M-PDCCH with VoLTE is possible violation of the time budget of VoLTE. Audio data packets are sent every 20 ms, so ideally, every audio packet should be scheduled within 20 ms. The resource allocation, or grant, that is carried by the M-PDCCH may be repeated in time, to allow the UE to decode it and in order to improve the link budget. Thus, this application may exceed the 20 ms window while the UE is trying to decode the resource allocation to decode the audio payload.

To avoid this, the audio packets may, in some scenarios, be bundled, and semi-persistent scheduling (SPS) may be utilized. For example, instead of using a grant for each audio packet, the network may transmit a single grant for multiple audio packets; e.g., for three or four audio packets. Thus, the multiple audio packets may each use the same resource allocation, which may provide a longer window (e.g., 80 ms for a bundle of four audio packets) for the UE to decode the audio packets. Additionally, in some scenarios, the network may change resource assignments infrequently, so as to avoid a need to send a M-PDCCH.

As another example, the wearable category may allow increased data rates relative to the 1 Mbps supported by Cat-M1. To accomplish this, the bandwidth of the wearable category may be increased relative to the bandwidth of Cat-M1. Cat-M1 has a fixed bandwidth of 1.4 MHz, or 6 resource blocks (RBs). In some scenarios, the wearable category may operate with a higher bandwidth, such as 15 RBs (e.g., to support Cat-1 functions) or 25 RBs. In some scenarios, the wearable category may exceed 6 RBs only when additional bandwidth is appropriate or necessary; e.g., when additional bandwidth is available and/or when additional bandwidth would improve quality of service, such as when the wearable device is located near the cell edge or requires higher throughput. In some scenarios, the wearable category may exceed 6 RBs whenever sufficient resources are available, e.g., to provide additional power in the downlink, thus improving link budget for wearable devices operating according to the wearable category. For example, in some scenarios, the base station may determine the bandwidth to allocate to a device operating according to the wearable category, e.g., based on available resources and/or one or more signal quality metrics.

Other Performance-Sensitive Applications

Other performance-sensitive applications, such as interactive, near real-time, or low-data-rate/periodic applications, may include applications such as audio streaming or time-sensitive periodic reporting for such applications as health monitoring. Such applications may benefit from the improvements noted above with regard to delay-tolerant applications. Additionally, some near real-time applications may benefit from additional bandwidth relative to Cat-M1, especially when the wearable device is located near the cell edge. For example, supporting audio streaming may require bandwidth up to 5 MHz, and throughput up to 100 Kbps. Thus, for such near real-time applications, the wearable category may allow increased data rates, e.g., as described above with regard to VoIP-type applications. Alternatively, some low-data-rate/periodic reporting for such applications as health monitoring, may utilize low data rates (e.g., 64 Kbps), but may provide periodic communications having certain time constraints. Thus, for such applications, the wearable category may allow QoS specification. In some scenarios, the wearable category may allow for dedicated DRBs, e.g., as described above with regard to VoIP-type applications.

As noted above, in some scenarios the network may allocate additional bandwidth (e.g., beyond the 6 RBs specified for Cat-M1) to a wearable device only if the wearable device indicates that it is implementing a certain application or an application of a certain classification. Other improvements over Cat-M1, such as use of dedicated DRBs, may be similarly restricted to certain applications. Thus, in order to have additional resources, such as bandwidth and/or DRBs, allocated by the network, the wearable device may indicate that it is implementing an interactive, near real-time, or low-data-rate/periodic application. However, such applications may not face the same performance constraints as VoIP-type applications. For example, audio streaming may not require a guaranteed bit rate (GBR) resource type, as is specified by QCI1. Thus, it may be inappropriate for the wearable device to request increased resources for interactive, near real-time, or low-data-rate/periodic application using QCI1 and QCI5, as with VoIP-type applications. Instead, the wearable category may support additional QCI bearers, other than the QCI1 and QCI5 bearers supported for VoIP-type applications.

In some scenarios, the wearable category may support a new QCI bearer, which may be referred to herein as QCI15, and which may indicate that a UE operating according to the wearable category is implementing an interactive, near real-time, or low-data-rate/periodic application, and which may specify parameters appropriate for such applications. For example, as suggested above, QCI15 may specify a non-GBR resource type. In some scenarios, QCI15 may specify a priority level that prioritizes QCI15 communications above generic Transmission Control Protocol (TCP) traffic, such as email traffic, or generic QCI8 or QCI9 traffic. For example, QCI15 may specify a priority level of 7.5. In some scenarios, QCI15 may specify a packet delay budget of 100 ms, e.g., to allow for continuous audio streaming. In some scenarios, QCI15 may specify a packet error loss rate of $10^{-3}$.

Figure 5:
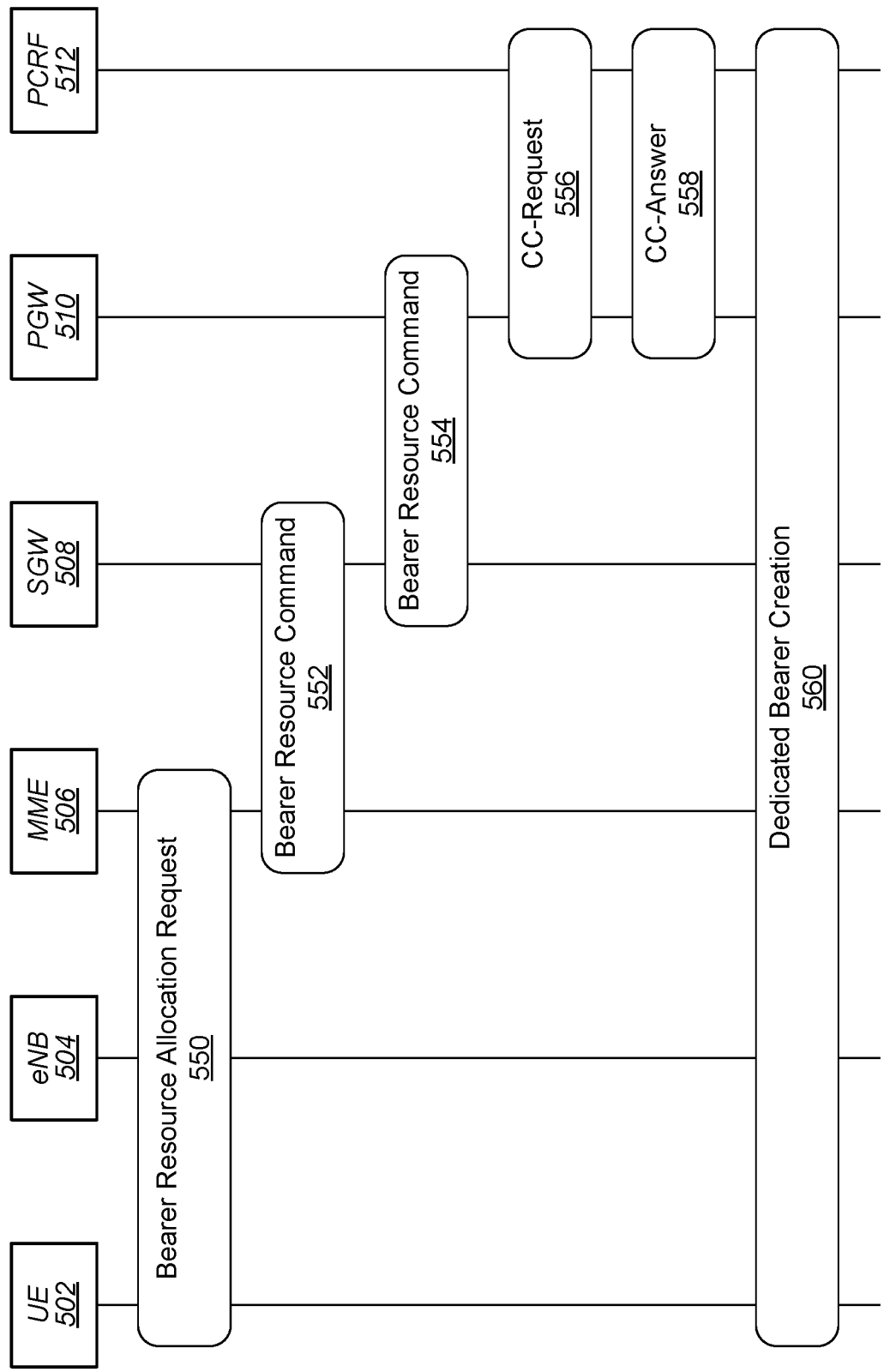
FIG. 5 illustrates a call flow showing a procedure for requesting a dedicated bearer, according to some embodiments.

The wearable device may request a dedicated QCI15 bearer, e.g., using a UE requested bearer resource allocation procedure, as shown in FIG. 5. FIG. 5 illustrates a call flow showing network elements involved in this procedure. A UE 502 may be a wearable device, such as the UE 106. The UE 502 may transmit a bearer resource allocation request 550 to an eNB 504, which may be a base station, such as the BS 102. The bearer resource allocation request 550 may indicate a QCI value of 15. The bearer resource allocation request 550 may also include additional information regarding requested resources, such as a bit rate, etc. The eNB 504 may receive the bearer resource allocation request 550, and may pass at least a portion thereof to a mobility management entity (MME) 506. The MIME 506 may receive the bearer resource allocation request 550, and may, in response, transmit a bearer resource command 552 to reserve the bearer resources on a serving gateway (SGW) 508. The SGW 508 may receive the bearer resource command 552, and may, in response, transmit another bearer resource command 554 to reserve the bearer resources on a packet data network (PDN) gateway (PGW) 510. The PGW 510 may receive the bearer resource command 554, and may, in response, transmit a credit control request (CC-Request) 556 to a policy and charging rules function (PCRF) 512. The PCRF 512 may receive the CC-Request 556 and may, in response, transmit a credit control answer (CC-Answer) 558 to the PGW 510. At 560, the various network elements may create the dedicated bearer according to the parameters specified by QCI15, e.g., according to known bearer creation procedures.

Because the eNB 504 and MME 506 received the bearer resource allocation request 550, indicating a QCI value of 15, those elements may be aware that the UE 502 is implementing an interactive, near real-time, or low-data-rate/periodic application. Thus, the eNB 504 and/or the MME 506 may make resource allocation decisions, such as bandwidth allocation, appropriate for such applications.

Figure 6:
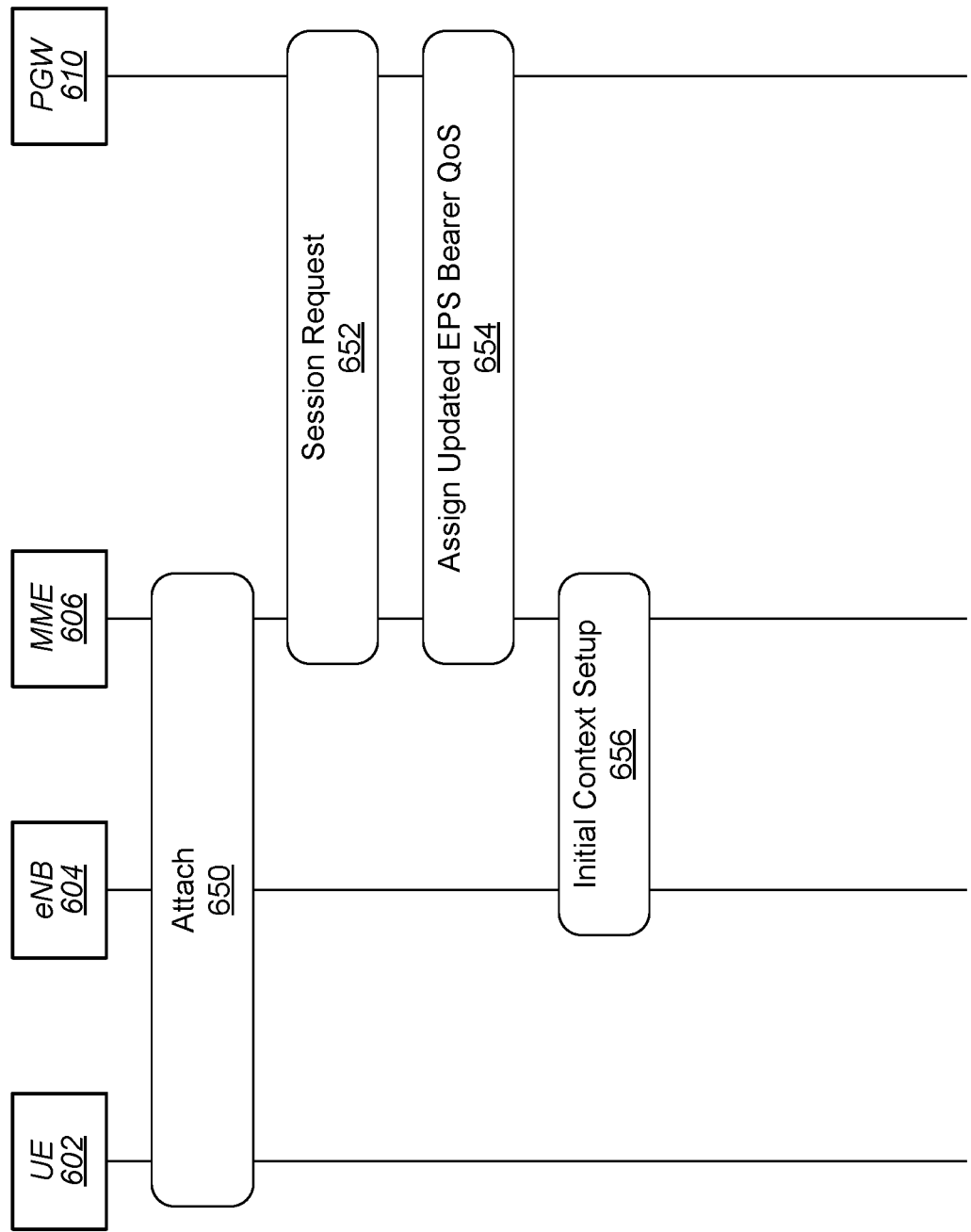
FIG. 6 illustrates a call flow showing a procedure for attaching to a specific Access Point Name (APN), according to some embodiments.

Alternatively, or additionally, the wearable device may indicate that it is using an interactive, near real-time, or low-data-rate/periodic application by requesting a specific Access Point Name (APN), as illustrated in FIG. 6. FIG. 6 illustrates a call flow showing network elements involved in this procedure. A UE 602 may be a wearable device, such as the UE 106. The UE 602 may transmit an attach request 650 to an eNB 604, which may be a base station, such as the BS 102. The eNB 604 may receive the attach request 650, and may pass at least a portion thereof to an MME 606. The attach request 650 may indicate a specific APN to which the UE 602 requests attachment. The specific APN indicated in the attach request 650 may be designated for (or otherwise associated with) wearable devices implementing a specific application or classification of applications.

The MME 606 may receive the attach request 650, and may, in response, transmit a session request 652 to a PGW 610. The session request 652 may indicate the specific APN to which the UE 602 has requested to attach. The PGW 610 may receive the session request 652, and may, in response, transmit updated evolved packet system (EPS) bearer QoS assignment 654 to the MME 606. Specifically, the PGW 610 may recognize that the specific APN indicated is designated for wearable devices implementing a specific application or classification of applications, and may assign QoS for the session as specified or as appropriate for that specific application or classification of applications. As a specific example, the PGW 610 may assign QoS as defined above for QCI15; e.g., non-GBR resource type, priority level of 7.5, packet delay budget of 100 ms, and packet error loss rate of $10^{-3}$.

The MME 606 may receive the updated EPS bearer QoS assignment 654, and may, in response, transmit an initial context setup message 656 to the eNB 604. The initial context setup message 656 may indicate the EPS bearer QoS assigned by the PGW. Thus, the eNB 604 and the MME 606 may be aware that the UE 602 is implementing an interactive, near real-time, or low-data-rate/periodic application, and may, in some scenarios, further be aware of a specific application implemented. Thus, the eNB 604 and/or the MME 606 may make resource allocation decisions, such as bandwidth allocation, appropriate for such applications.

Figure 7:
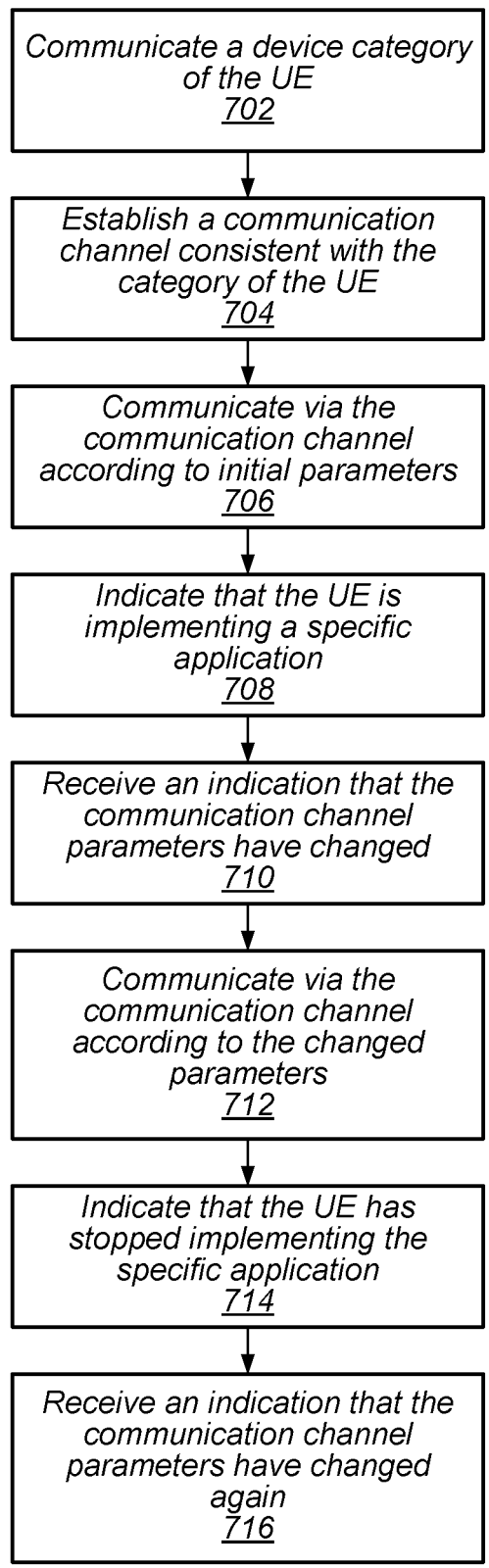
FIG. 7 is a flowchart diagram illustrating a method for conducting communications with devices of a wearable category, according to some embodiments.

FIG. 7—Conducting Communications with Devices of the Wearable Category

FIG. 7 is a flowchart diagram illustrating an exemplary method for a UE to utilize a wearable device category in conducting communications with a wireless communication network, according to some embodiments. The method shown in FIG. 7 may be used in conjunction with any of the computer systems or devices shown in the above Figures, among other devices. For example, the UE may be implemented as described above with reference to any of the UEs 106, 502, or 602. Some of the method elements shown may be performed concurrently or in a different order than shown, or may be omitted. Additional method elements may also be performed as desired.

At 702, the UE may transmit, or otherwise communicate, to the wireless communication network (e.g., to a base station of the wireless communication network, such as any of the base stations 102, 504, or 604), a device category of the UE. For example, the communicated device category may identify the UE as a wearable device (e.g., a device configured, optimized, etc., to operate according to communication parameters defined for a wearable device category).

At 704, the UE may establish a communication channel with the wireless communication network, consistent with the device category communicated by the UE. Specifically, the communication channel may be established with initial communication parameters consistent with parameters defined for the communicated device category (e.g., wearable device category). The initial parameters may be determined by the wireless communication network, based at least in part on (e.g., responsive to) the device category communicated by the UE.

Where the device category identifies the UE as a wearable device, the initial parameters may, in some scenarios, include parameters selected for a wearable device implementing delay-tolerant applications (e.g., for a wearable device that is not implementing delay-intolerant wireless communication applications, such as VoIP applications or other performance-sensitive applications, as discussed above). For example, such initial parameters may include a fixed bandwidth, mobility support, use of M-PDCCH, and/or other parameters discussed above with regard to delay-tolerant applications. In some embodiments, the wireless communication network may default to utilizing parameters selected for delay tolerant applications, e.g., unless the UE indicates that it is implementing a specific application requiring (or preferring) additional bandwidth (e.g., VoIP applications or other performance-sensitive applications, as discussed above).

The UE may configure hardware, software, or both to communicate with the wireless communication network according to the initial parameters. At 706, the UE may spend some period of time communicating with the wireless communication network via the established communication channel according to the initial communication parameters.

At 708, the UE may indicate to the wireless communication network that the UE is implementing the specific application. For example, the UE may transmit an indication that it is implementing a VoIP application or another performance-sensitive application, as discussed above. This may be in response to the UE initiating implementation of a specific application that requires (or prefers) communication parameters other than the current parameters of the communication channel (e.g., other than the initial communication parameters). The UE may indicate that it is implementing a specific application by, e.g., specifying (e.g., requesting) one or more QCI values, requesting attachment to a specific APN, providing an explicit indication, or by some other means. The indication may be transmitted via the communication channel according to the initial communication parameters.

At 710, the UE may receive, from the wireless communication network, an indication that the communication channel parameters have changed. For example, the wireless communication network may have changed the communication channel parameters in response to the UE indicating implementation of the specific application, e.g., to accommodate requirements or preferences associated with using the communication channel to support the specific application. For example, the changed parameters may include an increased bandwidth, a dynamic bandwidth, different QoS values, and/or other parameters discussed above with regard to VoIP applications and/or other performance-sensitive applications. The indication that the communication channel parameters have changed may be received in any of various forms, such as, e.g., an explicit indication, or a communication indicating establishment of a dedicated bearer (e.g., the UE may receive a communication indicating that a bearer is being established—that bearer establishment is complete, initiated, or underway, such as an RRC CONNECTION RECONFIGURATION MESSAGE indicating establishment of a dedicated bearer). The indication that the communication channel parameters have changed may include a description, code, or other information identifying the specific changes.

At 712, the UE may communicate on the communication channel according to the changed parameters. For example, the UE may perform communications with the wireless communication network in support of the specific application. Communicating on the communication channel according to the changed parameters may include (e.g., may require or benefit from) the UE reconfiguring hardware, software, or both to operate according to the changed parameters, in response to receiving the indication at 710 that the communication channel parameters have changed. For example, the UE may reconfigure operational software and/or hardware settings (e.g., within the radio 330) for encoding and/or decoding signals transmitted or received with the changed parameters.

At 714, the UE may indicate to the wireless communication network that the UE is no longer implementing the specific application. The indication may be responsive to, or may be inherent in, termination of the specific application by the UE. For example, the UE may indicate that it is no longer implementing a VoLTE application by terminating a VoLTE call. As another example, the UE may transmit an explicit indication that it has ceased implementing the specific application.

At 716, the UE may receive, from the wireless communication network, an indication that the communication channel parameters have again changed. For example, the wireless communication network may have changed the communication channel parameters in response to the UE indicating that the UE is no longer implementing the specific application. For example, if, after cessation of the specific application, the UE is implementing only delay-tolerant applications (e.g., not implementing any delay-intolerant applications), then the wireless communication network may change the communication channel parameters back to the initial parameters.

In response to receiving the indication at 716 that the communication channel parameters have again changed, the UE may further reconfigure hardware, software, or both to communicate with the wireless communication network according to the changed parameters.

It should be appreciated that the UE may indicate to the wireless communication network any status change regarding the applications currently implemented by the UE, in a manner similar to that described with regard to steps 708 and 714. In response, the wireless communication network may determine the communication parameters required (or preferred) for a UE of the identified device category implementing applications of the type currently being implemented by the UE (e.g., the applications that the UE has notified the wireless communication network that the UE is presently implementing), as defined by the identified device category. If required (or appropriate) the wireless communication network may change the communication parameters of the communication channel appropriately, and may indicate the change to the UE.

For example, in some scenarios according to the method of FIG. 7, the UE may additionally initiate implementation of a second specific application, e.g., while the UE is communicating with the wireless communication channel at step 712. The UE may indicate this to the wireless communication network in a manner similar to that described with regard to step 708. If necessary (or appropriate) the wireless communication network may further change the communication parameters to accommodate the second specific application, and may indicate the change to the UE, e.g., in a manner similar to that described with regard to step 710.

For example, if, at step 708, the UE of the wearable device category indicates that it is implementing a low-data-rate/periodic reporting application, then the wireless communication network may indicate to the UE (received by the UE at step 710) a change in QoS parameters (among other possible parameter changes), but may not indicate a change in bandwidth, e.g., because the low-data-rate/periodic reporting application may not require (or prefer) a bandwidth different than that specified for delay-tolerant applications. If the UE later indicates (e.g., during step 712) that it has initiated a VoIP application, then the wireless communication network may indicate to the UE a further change in QoS parameters, as well as a change in bandwidth (among other possible parameter changes), to accommodate the VoIP application. The UE may reconfigure appropriate hardware and/or software to accommodate these changes, allowing continued communication with the wireless communication network.

As an alternative example, the UE of the wearable device category might first (e.g., at step 708) indicate that it is implementing a VoIP application, prompting the wireless communication network to indicate a change in the communication parameters to accommodate the VoIP application (e.g., at step 710). If the UE later indicates (e.g., during step 712) that it has initiated a low-data-rate/periodic reporting application, then the wireless communication network may not, in some scenarios, indicate a further change to the communication parameters. For example, the communication parameters selected to accommodate the VoIP application may allow performance exceeding that allowed by the communication parameters for the low-data-rate/periodic reporting application. Thus, the communication parameters of the communication channel at step 712 may already be sufficient to accommodate the low-data-rate/periodic reporting application. However, at step 714, the UE may indicate that the UE has stopped implementing the VoIP application. In this scenario, the indication received at step 716 may indicate that the communication parameters have changed to no longer accommodating the VoIP application, e.g., while still accommodating the low-data-rate/periodic reporting application. Thus, in this scenario, the communication parameters may not return to the initial parameters at step 716.

It should thus be appreciated that the UE may indicate to the wireless communication network any number of status changes regarding the applications currently implemented by the UE, and that the wireless communication network may determine the communication parameters required (or preferred) for a UE of the identified device category implementing applications of the type currently being implemented by the UE (e.g., the applications that the UE has notified the wireless communication network that the UE is presently implementing), as defined by the identified device category. If required (or appropriate) the wireless communication network may change the communication parameters of the communication channel appropriately, and may indicate the change to the UE. In response, the UE may reconfigure software and/or hardware to accommodate the changed communication parameters.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method of conducting wireless communications between a user equipment device (UE) and a wireless communication network, the method comprising:
by the UE:
communicating to the wireless communication network a device category of the UE, the device category specifying different parameters for devices implementing each of a plurality of classes of applications;
establishing a communication channel with the wireless communication network, the communication channel having parameters determined at least in part based on the device category of the UE, wherein the parameters comprise a fixed bandwidth;
indicating to the wireless communication network, after establishing the communication channel, that the UE is implementing a specific application, the specific application belonging to a first class of the plurality of classes of applications; and
receiving an indication from the wireless communication network that the communication channel parameters have changed, wherein the received indication is in response to the indicating that the UE is implementing the specific application, wherein changed parameters comprise an increased bandwidth.

2. The method of claim 1, wherein the indicating that the UE is implementing the specific application comprises specifying a Quality of Service (QoS) Class Identifier (QCI) value.

3. The method of claim 1, wherein the indicating that the UE is implementing the specific application comprises requesting attachment to a specific Access Point Name (APN).

4. The method of claim 1, wherein the indication that the communication channel parameters have changed comprises a message indicating establishment of a dedicated bearer for the specific application.

5. The method of claim 1, wherein the increased bandwidth comprises a dynamic bandwidth determined by the wireless communication network.

6. The method of claim 1, wherein the changed parameters further comprise changed quality of service (QoS) parameters.

7. The method of claim 1, wherein the specific application comprises a voice over Internet protocol (VoIP) application, the method further comprising utilizing a machine type communications (MTC) physical downlink control channel (M-PDCCH) for scheduling bundled VoIP audio packets.

8. A user equipment device (UE) comprising:
at least one memory; and
at least one processor coupled to the at least one memory, wherein the at least one processor is configured to cause the UE to:
establish a communication channel with a wireless communication network, the communication channel having initial parameters consistent with a device category of the UE, the device category specifying different parameters for devices implementing each of a plurality of classes of applications;
transmit to the wireless communication network, after establishing the communication channel, a first indication that the UE is implementing a specific application, the specific application belonging to a first class of the plurality of classes of applications; and
receive a second indication from the wireless communication network, responsive to the first indication, that the communication channel parameters have changed.

9. The UE of claim 8, wherein the initial parameters are further consistent with a device of the device category of the UE implementing delay-tolerant applications, and wherein the changed parameters are consistent with a device of the device category of the UE implementing a voice over Internet protocol (VoIP) application.

10. The UE of claim 8, wherein the initial parameters comprise a fixed bandwidth, and wherein the changed parameters comprise an increased bandwidth.

11. The UE of claim 10, wherein the increased bandwidth comprises a dynamic bandwidth determined by the wireless communication network.

12. The UE of claim 8, wherein the device category of the UE indicates that the UE belongs to a wearable device category.

13. The UE of claim 8, wherein the specific application comprises a voice over Internet protocol (VoIP) application, and wherein the at least one processor is further configured to cause the UE to utilize a machine type communications (MTC) physical downlink control channel (M-PDCCH) for scheduling bundled VoIP audio packets.

14. The UE of claim 8, wherein the indicating that the UE is implementing the specific application comprises specifying a Quality of Service (QoS) Class Identifier (QCI) value.

15. A non-transitory computer-readable medium storing program instructions executable by at least one processor of a user equipment device (UE) to cause the UE to:
communicate with a wireless communication network via a communication channel having first parameters specified by a wearable device category for a device implementing a delay-tolerant application, the wearable device category specifying different parameters for devices implementing different classes of applications;
initiate implementation of a voice over Internet protocol (VoIP) application;
transmit to the wireless communication network, over the communication channel having the first parameters, a first indication that the UE is implementing the VoIP application; and
receive a second indication from the wireless communication network, responsive to the first indication, that the communication channel has changed to have second parameters specified by the wearable device category for the device implementing the VoIP application.

16. The non-transitory computer-readable medium of claim 15, wherein the instructions are further executable to cause the UE to:
initiate implementation of a time-sensitive periodic application after receiving the second indication;
transmit to the wireless communication network, over the communication channel having the second parameters, a third indication that the UE is implementing the time-sensitive periodic application;

transmit to the wireless communication network, over the communication channel having the second parameters, a fourth indication that the UE has stopped implementing the VoIP application;

receive a fifth indication from the wireless communication network, responsive to the fourth indication, that the communication channel has changed to have third parameters specified by the wearable device category for a device implementing the time-sensitive periodic application, the third parameters being different than the first parameters and the second parameters.

17. The non-transitory computer-readable medium of claim 15, wherein the first parameters comprise a fixed bandwidth, and wherein the second parameters comprise an increased bandwidth.

18. The non-transitory computer-readable medium of claim 17, wherein the increased bandwidth comprises a dynamic bandwidth determined by the wireless communication network.

19. The non-transitory computer-readable medium of claim 15, wherein the instructions are further executable to cause the UE to:

reconfigure operational settings of the UE to communicate with the wireless communication network according to the second parameters, in response to receiving the second indication.

20. The non-transitory computer-readable medium of claim 15, wherein the second parameters comprise use of a machine type communications (MTC) physical downlink control channel (M-PDCCH) for scheduling bundled VoIP audio packets.

* * * * *